United States Patent Office 3,176,508
Patented Apr. 6, 1965

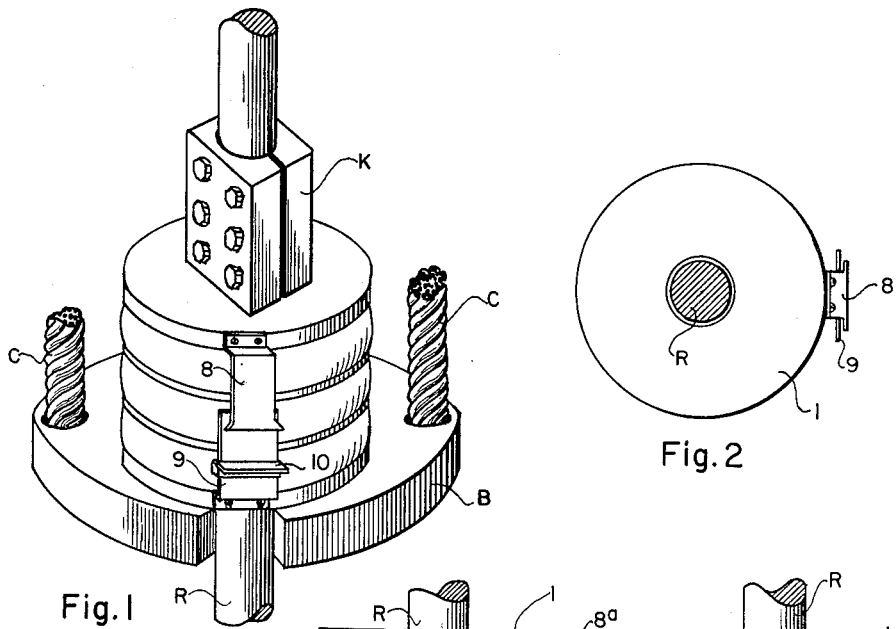
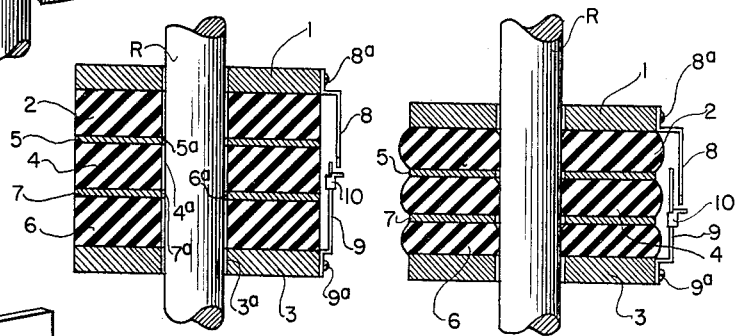
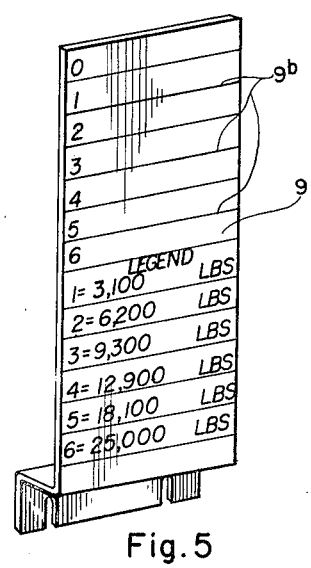
INVENTOR.
WARREN F. WARD

3,176,508
WEIGHT SCALE AND SHOCK ABSORBER
Warren F. Ward, 4419 Rawlins St., Dallas 19, Tex.
Filed June 4, 1962, Ser. No. 199,733
6 Claims. (Cl. 73—141)

This invention relates to a combined weight-indicating scale and shock absorber, having particular utility when interposed between a polish rod clamp and the carrier bar of an oil-well pumping unit which is reciprocating a sucker rod within a tubing string.

More particularly, this invention relates to a combined cushion and scale comprising a series of oil-resistant synthetic rubber discs interposed between alternate steel discs to comprise a compressive cushion, this assembly of alternate metal and rubber discs having a central bore extending therethrough of sufficient size to loosely receive a polish rod. In such an assembly the polish rod is prevented from dropping out of the cushion by a polish rod clamp of conventional type, and the lower end of the cushion is supported on the carrier bar of any conventional type oil-well pumping unit. Expired Patent 2,038,527 shows a typical assembly of the type to which the present invention is addressed.

It is the principal object of this invention to provide the combination of a weight-indicating scale and a shock absorber, which combination is itself believed to be novel, and also to provide in this combination an improved structure in which the rubber members are each fully bonded to the metal discs which are located adjacent to them so as to provide a plurality of improved features which are obtained primarily because of the bonding, but which are not obvious results thereof. Considering the present novel unit from the point of view of its shock absorber function, it is of major importance that it be able to withstand continuous usage without itself being chafed or worn away by abrasion, and without permitting the polish rod extending through the unit to be rubbed and worn against the metal discs of the unit. When the rubber members are bonded to the metal discs, and have substantially the same size bore therethrough as through the discs, which bore in the relaxed condition of the rubber is of substantially greater diameter than the diameter of the polish rod, wear on the polish rod by contact with the metal discs is prevented because of the fact that as soon as the rubber between the discs is compressed at all, it bulges inwardly in the direction of the polish rod and thereby centralizes the polish rod through the discs so that it does not contact them.

Another highly important advantage of bonding the rubber to the discs lies in the protection of the rubber itself from excessive wear due to the continuous alternate expansion and compression of the rubber between the discs. When there is no load on the rubber, which can occur at the top of the pump stroke when the walking beam is reversing its motion to begin moving in the downward direction, the rubber is in substantially relaxed condition, and is of substantially the same diameter both inside and outside as the metal discs. At this point the compression of the rubber begins, and if the rubber is not bonded to the discs, the surface of the rubber which is in contact with each disc experiences not only a compressive force, but it also is displaced so that it slides radially in frictional contact with the surfaces of the discs in order to permit some of the rubber to escape from between the discs. Then again, as the axial compression of the rubber diminishes, the rubber which is adjacent to the surfaces of the discs migrates or slides frictionally against the discs back toward its relaxed condition. This continuous rubbing back and forth soon wears the rubber down and requires that the pumping operation be stopped and that the rubber be replaced, which requirement is wasteful both of time and materials. When the rubber is bonded to the adjacent surfaces of the discs, this chafing action is replaced by compression and for tension developed in the vicinity of the surface bond, but no abrasion occurs. Some of the prior art structures which employ the combination of alternate rubber and steel discs provide recesses in the adjacent faces of the steel discs which tend to confine the rubber and reduce its tendency to slide radially back and forth against the surfaces of the discs, but when the rubber rests in such recesses, it is sharply pinched and cut at by the outer edges of the recesses as the rubber flexes thereagainst, and this undesirable wear takes place to such an extent that the rubber tends to last only for a relatively short time before it deteriorates and has to be replaced. It is therefore a very substantial improvement as far as length of life of the rubber members is concerned that the rubber of the present novel structure is bonded directly to the faces of the discs and therefore cannot perform any sliding motion with respect thereto. At the present time, the applicant has had the structure of the present invention in continuous use at a pumped well for more than one year without apparent deterioration of the rubber.

It is another advantage of the bonding of the rubber to the metal discs that the discs and the rubber are always held in correct alignment, even though the sucker rod may stick in the tubing string and fail to drop therein. In structures in which the rubber is merely held between the discs by the weight of the tubing string thereon, any failure of the sucker rod to drop in the tubing string will permit the prior art shock absorbers to come to pieces and suffer probable misalignment and resulting damage when the sucker rod does drop in the tubing string and pumping is resumed.

Still another major advantage of the bonding of the rubber to the discs comes into effective play when the present inventive unit is used as a weight scale. As mentioned above, during compression of the rubber, when the rubber is not bonded to the metal discs, it slides radially outwardly and also inwardly near the center bore against the surface of the disc. The amount of sliding which occurs depends directly upon the coefficient of friction between the rubber and the disc as compared with the durometer hardness of the rubber. The coefficient of friction between the rubber and the disc can vary drastically depending on weather conditions and temperature. If, therefore, the rubber is not bonded to the discs, the total amount of supported weight measured by compression of the rubber will vary depending on weather and temperature conditions and also upon the age of the rubber and the smoothness of the metal discs which it contacts. It is therefore an important advantage to have the rubber bonded to the discs so that regardless of ambient conditions all of the displacement of the rubber by axial compression thereof takes place by way of flow of the rubber, rather than by scrubbing it against the adjacent surfaces of the discs. For this reason, a more accurate calibration of the compression of the rubber versus weight supported by the unit can be obtained. The bonding of the rubber also provides a unit that will do a better job of cushioning and will support more weight than a similar unbonded unit.

The applicant claims as novel the combination of the disc-type rubber shock absorber and a weight-measuring scale, particularly wherein the rubber is bonded to the metal discs so as to provide better accuracy of scale readings.

It is also an important advantage resulting from the bonding of the rubber to the discs that whenever the load is taken off of the unit, the rubber fully returns to its original shape, which return depends entirely upon the "memory" of the rubber, and not upon the particular instantaneous coefficient of friction between the rubber and the adjacent metal discs.

The present structure is the result of extensive tests on various designs, which tests showed that it was an advantage to provide a unit that is at least as large in diameter as it is high so as to maintain easier alignment of this unit with the polish rod and so as to provide a relatively large volume of rubber between the discs so as to provide a reasonable linear length of compression. The present unit is 5″ in diameter and compresses a total of ¾″ while changing the loading from zero to 25,600 pounds. The weight indicating scale is calibrated in ⅛″ steps so that the operator can tell at a glance the approximate instantaneous weight being supported by the unit. The scale is also provided with a sliding follower which frictionally maintains itself in place and remains at the highest weight measured by the scale after it is displaced from zero. There are a number of bits of information that a skillful operator can determine by observing the weight scale. One bit of information which shows up immediately is whether or not the well is still pumping oil, or whether it has "pumped off." Ordinarily, there is no way of telling whether oil is actually still flowing from the pump unless there is a glass observation tube in the discharge pipe from the well to the stock or storage tank, or unless there is a dynamometer in the system, which dynamometer is a vastly more complex and difficult instrument to read, and which cost approximately $1700 With the present unit mounted on the carrier bar, the weight-indicating scale will show a marked decrease in load on the upstroke if the well has been pumped off and is producing no flow of oil. This same weight indicator will also show any abnormal conditions, such as paraffin build-up in the tubing, or bottom-hole pump trouble such as a stuck valve.

Other objects and advantages of my invention will become apparent during the following discussion of the drawing, wherein:

FIG. 1 is a perspective view showing my novel weight-measuring and shock-absorbing unit interposed between the polish rod clamp and the carrier bar of a pumping unit;

FIG. 2 is a plan view of my unit;

FIG. 3 is a longitudinal section view taken through the unit showing it in releaxed condition;

FIG. 4 is a partial sectional view similar to FIG. 3 but showing the unit axially compressed;

FIG. 5 is an enlarged detail view in perspective showing the lower member of the weight-measuring scale;

FIG. 6 is an enlarged detail view in perspective showing the upper member of the weight-measuring scale; and FIG. 7 is a perspective detail view showing the friction follower bar for indicating the greatest weight measured.

Referring now to the drawings, FIG. 1 shows a perspective view of my novel unit measuring the weight imposed upon it by a polish rod R supported by a rod clamp K and my unit resting upon a carrier bar B supported on a harness of wire cables C which are reciprocated up and down by a pumping unit (not shown) of any conventional type.

The present weight scale scale and shock-absorber unit comprises a plurality of metal plates or discs including an upper end disc 1, a lower end disc 3 and several intermediate discs 5 and 7 alternating with rubber cushion discs 2, 4, and 6 interposed therebetween and bonded to the surfaces of the metal discs.

In relaxed condition, all of the metal and rubber discs are the same diameters and have bores extending therethrough such as those shown at 3a, 4a, 5a, 6a, and 7a. The inside of this composite bore is substantially larger than the outside diameter of the polish rod R, and in the working embodiment referred to above where the discs are 5″ in diameter, the clearance between the bore and a 1⅛″ polish rod is about 3/16″.

By comparing FIG. 4 with FIG. 3, it will be seen that when the weight scale and shock absorber unit is axially compressed, the rubber bulges inwardly in a radial direction from between the discs 1, 3, 5, and 7, and the radially inward bulge of the rubber precisely centers the polish rod R in the bores through the metal discs 1, 3, 5, and 7 so that the polish rod remains out of contact with the discs at all times, while at the same time providing dielectric insulation between the polish rod and the metal discs, as well as the carrier bar B which supports the assembly, thereby breaking the tendency of current to flow through the sucker rod, caused by electrolysis of the sucker rod and the metal members attached to it in the electrolyte of the well, such electrolysis being a well known detriment in oil-well equipment.

The weight-measuring scale comprises upper and lower members and a slide bar, as shown in FIGS. 5, 6, and 7. The upper member 8 comprises a metal bracket which is attached to the upper disc 1 by screws 8a and which extend down approximately half way along the side of the shock-absorber unit. The lower member 9 of the scale is attached to the lower disc 3 and is held in place by screws 9a as shown in FIGS. 3 and 4, appropriate holes for maintaining these members in place being provided to receive the screws 8a and 9a. When the shock-absorber unit is in relaxed condition, the upper and lower members barely overlap, approximately at the center of the unit. However, as the axial compression of the rubber members 2, 4 and 6 increases, the upper and lower members 8 and 9 of the scale overlap increasingly and the bottom edge 8b of the upper member registers with one of the calibration lines 9b of the lower member 9 and provides an indication of the amount of compression of the shock-absorber unit. A follower slide bar 10, FIG. 7, supports itself on the lower scale member 9 and grips this member with a frictional grip which is sufficient to prevent displacement of the follower bar by vibration, although this grip is not so great that the follower bar 10 cannot be pushed downwardly by the upper scale member 8 striking against it. This slide bar follower has a horizontal surface 10a adapted to be struck by the lower edge 8b of the upper scale member 8 in order to displace the slide bar downwardly, and also has two brackets 10b which extend around the lower scale member 9 and maintain the slide bar in place thereon.

In general, this weight-measuring scale and shock-absorber unit is calibrated on a compression measuring laboratory instrument and a legend is provided on the lower half of the lower scale member 9 which has numbers 1 through 6 corresponding with like numbers adjacent the indicia lines 9b to indicate how many pounds of compression each of these lines represents. The legends are then placed on the lower scale member 9 and indicate the weight in pounds corresponding with the indicia line located just above the surface 10b of the slide bar follower.

I do not limit my invention to the exact form shown in the drawings, for obviously changes may be made therein within the scope of the appended claims. For instance, the type of weight-measuring scale could be changed from a simple overlapping scale calibrated in terms of weight per ⅛″ deflection, to a rotary dial strain gauge which could be calibrated directly in terms of pounds for various deflections.

I claim:

1. A combined measuring scale and shock absorber, comprising two end plates having mutually parallel faces; resilient rubber cushioning means interposed between said end plates and substantially filling the space therebetween, the rubber being bonded to the faces of the plates over the entire area of mutual contact and the plates and cushioning means having a composite central bore of constant diameter when the cushioning means is relaxed extending therethrough normal to said faces; and scale means connected to said plates and responsive to relative displacement of the plates axially of the bore, the scale means being calibrated in terms of displacement.

2. A weight measuring scale and shock absorber, comprising a plurality of discs having mutually parallel faces; plural resilient rubber cushioning means interposed between said discs in alternate succession therewith and substantially filling the space therebetween, the rubber being bonded to the faces of the discs over the entire area of mutual contact and the discs and cushioning means having a composite central bore of constant diameter when the cushioning means is relaxed extending therethrough normal to said faces; and scale means connected between two of said discs and responsive to relative displacement of the discs axially of the bore, the scale means being calibrated in terms of displacement.

3. In a scale and shock absorber as set forth in claim 2, said scale means comprising two members fixed to different discs and overlapping each other, one member having calibration indicia thereon disposed to cooperate with the end of the other member to indicate mutual displacement of the discs axially of said bore; and a sliding follower bar frictionally gripping said one member and disposed opposite the end of the other member to be contacted and positioned by the latter upon the former to indicate the degree to which the cushioning means is compressed.

4. In a scale and shock absorber as set forth in claim 2, the composite succesion of discs and cushioning means being greater in diameter than in axial length.

5. In a scale and shock absorber as set forth in claim 1, said scale means comprising two members fixed to different plates and overlapping each other, one member having calibration indicia thereon disposed to cooperate with the end of the other member to indicate mutual displacement of the plates axially of said bore; and a sliding follower bar frictionally gripping said one member and disposed opposite the end of the other member to be contacted and positioned by the latter upon the former to indicate the degree to which the cushioning means is compressed.

6. In a scale and shock absorber as set forth in claim 1, the composite plates and cushioning means being greater in diameter than in axial length.

References Cited by the Examiner

UNITED STATES PATENTS

| | | | |
|---|---|---|---|
| 177,251 | 5/76 | Johnson | 73—141 X |
| 2,396,916 | 3/46 | Guthrie | 73—141 |
| 3,021,747 | 2/62 | Garrett | 73—88 X |

RICHARD C. QUEISSER, *Primary Examiner.*